March 10, 1959 R. K. ORTHUBER ET AL 2,877,371

INFORMATION DISPLAY DEVICE

Filed Aug. 16, 1955 3 Sheets-Sheet 1

INVENTORS.
RICHARD K. ORTHUBER
CHRISTIAN C. LARSON
GEORGE W. BAIN

BY George A. Gust
ATTORNEY

March 10, 1959 R. K. ORTHUBER ET AL 2,877,371

INFORMATION DISPLAY DEVICE

Filed Aug. 16, 1955 3 Sheets-Sheet 2

$h_i$ REPRESENTS ALL UNCONNECTED HORIZONTAL STRIPS.

$v_i$ REPRESENTS ALL UNCONNECTED VERTICAL STRIPS.

INVENTORS.
RICHARD K. ORTHUBER
CHRISTIAN C. LARSON
GEORGE W. BAIN

BY George A. Gust

ATTORNEY

March 10, 1959 R. K. ORTHUBER ET AL 2,877,371

INFORMATION DISPLAY DEVICE

Filed Aug. 16, 1955

3 Sheets-Sheet 3

INVENTOR.
RICHARD K. ORTHUBER
CHRISTIAN C. LARSON
BY GEORGE W. BAIN

George A. Gust

ATTORNEY

United States Patent Office 2,877,371
Patented Mar. 10, 1959

2,877,371

INFORMATION DISPLAY DEVICE

Richard K. Orthuber, Christian C. Larson, and George W. Bain, Fort Wayne, Ind., assignors to International Telephone and Telegraph Corporation Application August 16, 1955, Serial No. 528,765

2 Claims. (Cl. 313—108)

The present invention relates to an information display device, and more particularly to an electroluminescent phosphor screen.

An article appearing in "Review of Scientific Instruments," vol. 24 (1953), page 471, by Arthur Bramley and Jenny E. Rosenthal, describes a display screen or panel comprising two sets of grids of parallel conductive strips which have sandwiched therebetween a layer of electroluminescent phosphor material. The strips on opposite sides of the layer are arranged perpendicularly to each other, with the ends of the strips of each set respectively being connected to a distributor switch. The connections between the individual strips and the switch are such that at any time only one strip of each set is connected to a source of signal voltage such as a video amplifier. Assuming that the display panel is set in an upright position with one set of strips being vertical and the other set horizontal, the distributor switch operates to apply the signal voltage sequentially to the vertical strips at a relatively high rate and to the horizontal strips at a lower rate. For television purposes, the high rate corresponds to the horizontal line scanning frequency while the lower rate corresponds to the field or frame frequency.

While this invention is to be construed as relating generally to an information display device utilizing any suitable horizontal and vertical strip-scanning rates, it will be described specifically in connection with a television image display device having the usual horizontal and vertical scanning rates.

One difficulty encountered in the use of the above-described device is that in a standard television display little or no contrast between highlight and lowlight levels is discernible.

It is therefore an object of this invention to provide an information display screen having good contrast definition between highlight and lowlight brightness levels.

It is another object of this invention to provide a crossed grid phosphor screen which is operable to produce a marked contrast in an image between highlight and lowlight brightness levels.

In accordance with one practical embodiment of this invention there is provided a light-producing screen which embodies a phosphor layer composed of electroluminescent phosphor material, an impedance layer composed of material which possesses a non-linear "current vs. voltage" characteristic, both layers being sandwiched between a system of crossed grid conductors or strips, the conductors on the impedance layer extending transversely of the conductors on the phosphor layer, and means for sequentially applying a signal voltage to all of said conductors.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
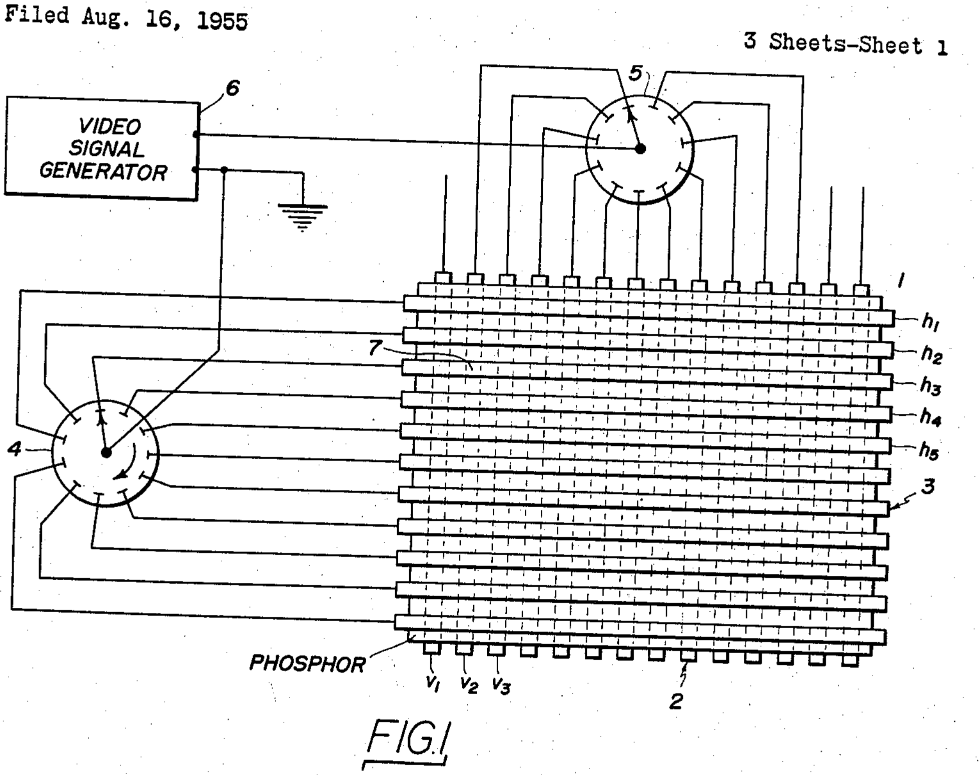
Fig. 1 is a diagrammatic illustration of one crossed grid phosphor screen used in explaining the principles of this invention.

Referring to the drawings, and more particularly to Figs. 1 through 4, a phosphor layer 1 composed of any suitable electroluminescent phosphor such as that described in Mager Patent No. 2,566,349 or Piper Patent No. 2,698,915 is confined or sandwiched between two sets or grids of strips or conductors which extend in directions perpendicular to each other. One grid, indicated generally by the reference numeral 2, is composed of spaced parallel and vertically extending strips or conductors indicated generally by the reference symbols $v_1$, $v_2$, $v_3$, etc. The other grid, indicated generally by the reference numeral 3, is composed of horizontally extending strips or conductors which are indicated respectively by the reference symbols $h_1$, $h_2$, $h_3$, etc. While the drawings show only a few such strips, it will be apparent to a person skilled in the art that any number of strips may be used depending upon the result desired. For example, a television image display screen has a large number of such strips, for example 500 or 1,000.

A distributor switching system is composed of two mechanical switches 4 and 5 which are connected respectively to the horizontal grids 3 and 2. A suitable source of signal voltage 6 is coupled to the rotors of these two switches so that as these two switches rotate at predetermined rates the signal voltage will be applied sequentially to the respective strips of the two grids 2 and 3. Since the phosphor material emits light in response to a variable electric field, flashes of light will be produced at the intersections of the individual strips as they become connected by means of the switches to the source 6.

In Fig. 1, the switches 4 and 5 are shown in a position where the vertical strip $v_2$ is connected to the source 6 and the horizontal strip $h_3$ is grounded. If the instantaneous amplitude of the source voltage is V, the switches making the contact shown will produce a voltage pulse of amplitude V at the intersection of the strips $v_2$ and $h_3$ as indicated by the numeral 7, and the phosphor sandwiched at this intersection will produce a flash of light of corresponding brightness. If the switching is performed at a rate corresponding to conventional television scanning in both vertical and horizontal directions, the flashes produced at these intersections will produce a brightness-pattern corresponding to the video signal. This simple operation is, however, impossible to achieve, for all practical purposes, by this simple construction for at least the two following reasons: (1) Flashes are produced not only at the intersection of the two connected strips, but also, though with reduced intensity, simultaneously along the entire lengths of the connected strips; (2) each element, i. e., the phosphor contained in one intersection, is excited for an extremely small fraction of frame-time (time to scan completely all strips of grid 3); therefore, the highlight brightness observed by the eye, which is a brightness averaged over the frame duration, is considerably below the brightness which the phosphor can display in continuous operation.

The net result of scanning the strips of the two grids is the production of a sheet of light spread over the entire phosphor layer of substantially uniform brightness. This is true even though the voltage V may vary from strip to strip.

Figure 2:
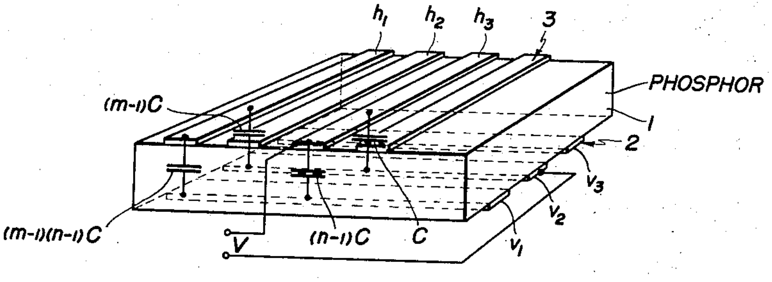
Fig. 2 is a diagrammatic perspective illustration of a portion of the screen of Fig. 1.
Figure 3:
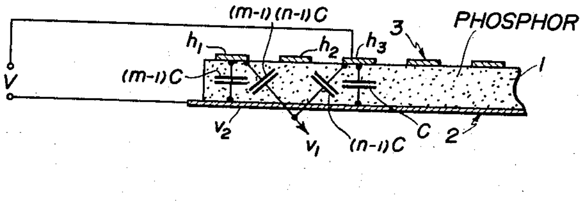
Fig. 3 is a fragmentary cross-section of the screen of Fig. 1.

In explanation of this intolerable result, reference is made to Figs. 2, 3 and 4 in the following. When the two switches 4 and 5 of Fig. 1 are connected momentarily to the two strips $v_2$ and $v_3$, a signal voltage of amplitude V at the intersection is produced. However, all the other strips of the two grids are respectively capacitively coupled to the two strips $v_2$ and $h_3$.

Figure 4:
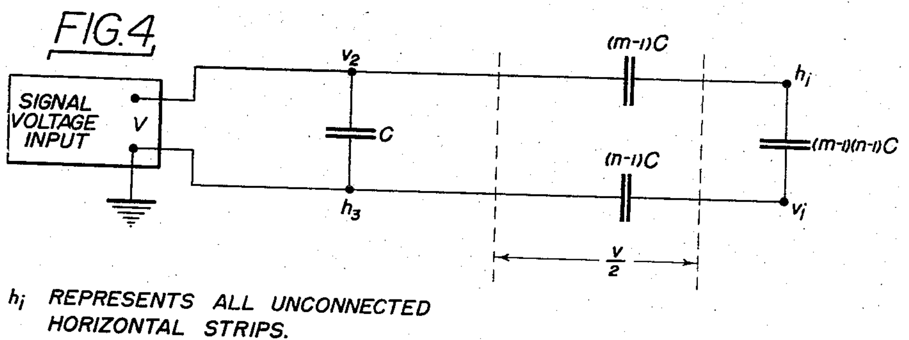
Fig. 4 is an equivalent electrical circuit diagram thereof.

Assuming that the elementary capacity of the phosphor between each strip intersection is C and that there are $m$ horizontal and $n$ vertical strips, the capacitive coupling between the strips (connected and unconnected) may be represented by the equivalent circuit diagram of Fig. 4. In this diagram, all of the unconnected horizontal strips are represented by the point $h_1$. Since $(m-1)$ unconnected horizontal strips intercept the connected vertical strip $v_2$, the capacity of this line system $h_1$ against strip $v_2$ is $(m-1)C$. Similarly the capacity of the unconnected vertical strips, represented by the symbol $v_1$, against the connected horizontal strip $h_3$, is $(n-1)C$ and the capacity between the unconnected strips of both grids 2 and 3 is $(m-1)(n-1)C$.

If, as will be true in the case of a television application, the number of horizontal and vertical strips is approximately equal, for example, 500 to 1,000, the voltage drop across the capacity $(m-1)(n-1)C$ is negligibly small and both the connected horizontal and vertical strips will receive along their entire length a video pulse of one-half the amplitude of the pulse V produced at the intersection of strips $v_2$ and $h_3$. Because of the approximate third power relationship between phosphor brightness and exciting voltage, the entire lengths of the connected lines $v_2$ and $h_3$ will light up with a brightness $$\frac{B}{8}$$

if the signal at the intersection produces a brightness B.

If a strip contains 500 intersections, the total light emission from the strips will be more than 100 times greater than the light emission from the spot or intersection selected by the scanning switches 4 and 5, and it becomes obvious that in a device such as that of Fig. 1, an image would be impressed on a background having about 100 times the average brightness of the image, which, of course, would lead to an intolerably low contrast condition.

Figure 5:
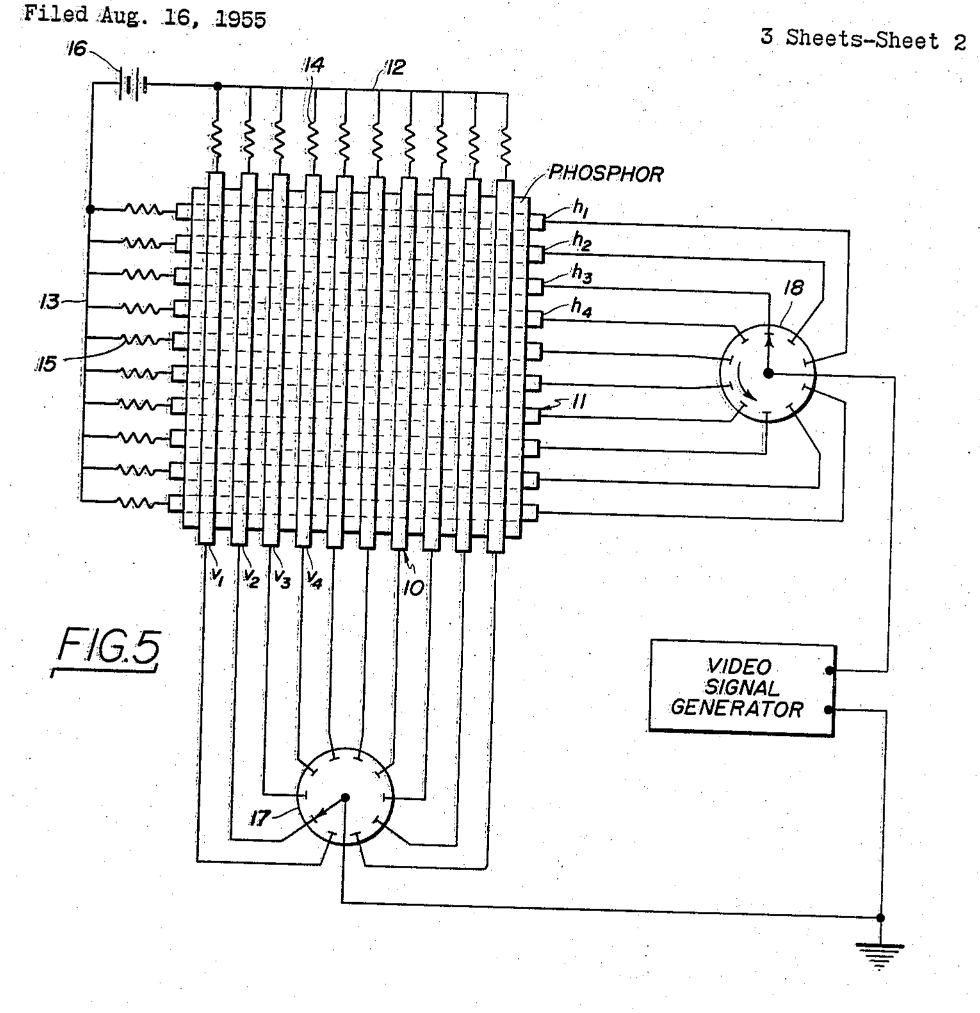
Fig. 5 is a plan view of one embodiment of this invention.
Figure 6:
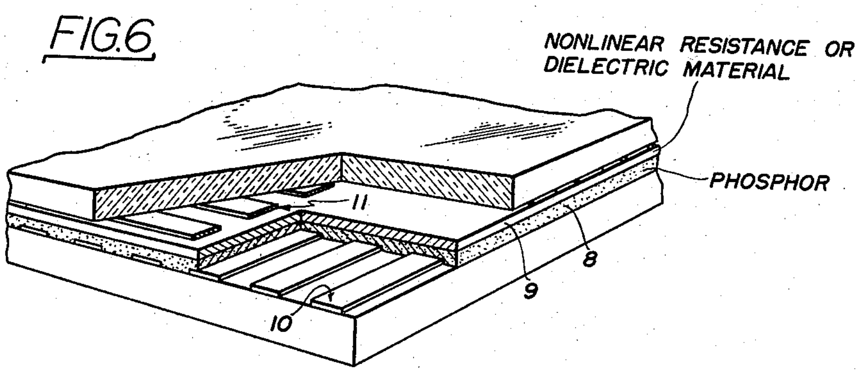
Fig. 6 is a perspective illustration of the device of Fig. 5 partially broken away.

This difficulty is overcome by means of the present invention by fabricating the phosphor panel according to Figs. 5 and 6 of the drawings.

The crossed grid display panel of Fig. 1 just described, contains only an electroluminescent phosphor layer sandwiched between the two grids, and it was proven that in such a panel excitation by a voltage pulse applied by two intersecting strips is not restricted to the intersection but is also present, though with reduced intensity, along the entire lengths of the two strips. For a large number of strips, the undesirable "strip-excitation" in volts is one-half of the useful excitation at the intersection of the connected strips.

Thus occurs the inescapable premise that one-half of the voltage applied at the intersection of the connected strips appears between the unconnected and connected strips, respectively, and this half voltage is of sufficient intensity to excite the phosphor material to an extent to hardly make the difference between highlight and low-light brightness levels discernible. Accepting the fact that this one-half voltage condition is always present, it will be shown in the following that it is possible to overcome the deleterious effects thereof and to produce an image having good contrast qualities.

The embodiment of Figs. 5 and 6 comprises the usual crossed grid electrodes or strips having sandwiched therebetween a layer 8 of electroluminescent phosphor which is in close contact with a layer 9 composed of material which possesses a non-linear "current vs. voltage" impedance characteristic. Non-linear relationships between current and voltage are known to exist in several groups of materials, for example, semi-conductors, polaristors and ferro-electric materials. Materials of all these groups are basically applicable to this invention to be described.

Semi-conductor materials, such as for example amorphous selenium and antimony trisulphide, are well known for their non-linear current versus voltage impedance characteristic, this characteristic being discussed in an article entitled "Photoconductivity in Amorphous Selenium" appearing in volume 12 of the R. C. A. Review for September 1951, pages 314–334 (see particularly Fig. 5 on page 324), and an article in the same volume of the R. C. A. Review entitled "Properties of Some Photoconductors, Principally Antimony Trisulphide," appearing at pages 335–349.

Polaristors are resistors formed by imbedding conductive or semi-conductive articles in a plastic layer with the hardening of the plastic being performed while the particles are present in a strong polarizing electric field. The conductivity of such layers varies materially with variations in applied voltage. For further details concerning polaristor material, reference is made to the following two publications: (1) H. E. Hollmann, "Journal of Applied Physics," vol. 21, pages 402–413, May 1950, and (2) H. E. Hollmann, "Proceedings of the I. R. E.," vol. 40, pages 538–545, May 1952.

Even though both semi-conductive and polaristor layers are applicable to this invention, the operation of the invention will be discussed for a cell containing ferro-electric materials for the layer 9.

The illustrated screen or cell is composed of a dielectric sandwich contained between two grids of parallel conductive strips extending perpendicular to each other. The dielectric sandwich consists of a layer 8 of electroluminescent material, e. g., electroluminescent powder, such as properly activated zinc fluoride as described in the above referred to Piper patent, 2,698,915, imbedded in a transparent plastic, in close contact with a layer 9 of variable impedance material, e. g., ferro-electric material as barium titanate as described in the section "Ferroelectric Crystals" in the book Introduction to Solid State Physics, by Charles Kittel, John Wiley and Sons, Inc., 1953. The strips composing grid 10 contiguous with the phosphor layer 8 are preferably transparent and may be composed of thin films of evaporated aluminum or silver or transparent conductive strips of stannous chloride or oxide as known by the trade name "Nesa." The strips of each grid 10 and 11 are connected respectively to conductive biasing electrodes or bus bars 12 and 13 over individual isolating resistors or decoupling means 14 and 15, respectively. The purpose of these resistors 13 and 14 is to reduce the conductive coupling between the individual strips of the same set and the bus bar thereby preventing the bus bar from shortening out the respective strips.

The bus bars 12 and 13 are connected to the terminals of a battery which supplies a biasing field across the ferro-electric layer 9.

It is of advantage to produce considerable leakage across the phosphor layer, which may be accomplished by adding semi-conductive or conductive particles in proper concentration to the phosphor material.

Distributor switching means similar to that in Fig. 1 and composed of switches 17 and 18 are connected to the vertical and horizontal strips 10 and 11 respectively.

Figure 7:
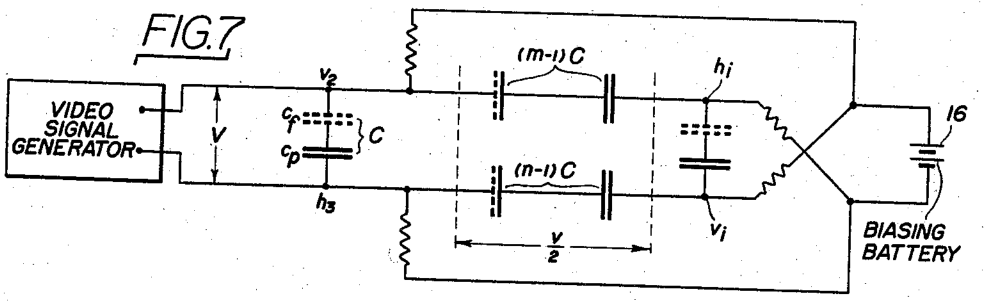
Fig. 7 is an equavalent circuit diagram of the screen of Fig. 5.

The operation of the device thus far described as well as the difference in operation over the device of Fig. 1 will become apparent by reference to the equivalent circuit diagram of Fig. 7.

For purposes of convenience, the same instantaneous operating conditions as considered for the device of Fig. 1 will be assumed to exist for the device of Fig. 5. The voltage or video pulse is, therefore, applied to the same vertical strip $v_2$ and horizontal strip $h_3$. The full video pulse of amplitude V is again applied to the capacitor C formed at the intersection of strips $v_2$ and $h_3$ and one-half of this pulse amplitude will appear along the remaining strips $v_2$ and $h_3$. However, now the intersection-capacity C between the strips $v_2$ and $h_3$ will be formed by two elemental capacitors $C_f$ and $C_p$ where $C_f$ is the capacity of the ferro-electric elements and $C_p$ the capacity of the phosphor element. The same holds true for the capacities between the selected and unselected strips. Under the influence of the proper biasing direct current field as supplied by the battery 16, the ferro-electric layer 9 will be polarized almost to saturation and will therefore respond to a given change in field with only a small displacement current. This property of ferro-electric materials has been described widely, for example in the above-referred to book Introduction to Solid State Physics, by Kittel.

Figure 8:
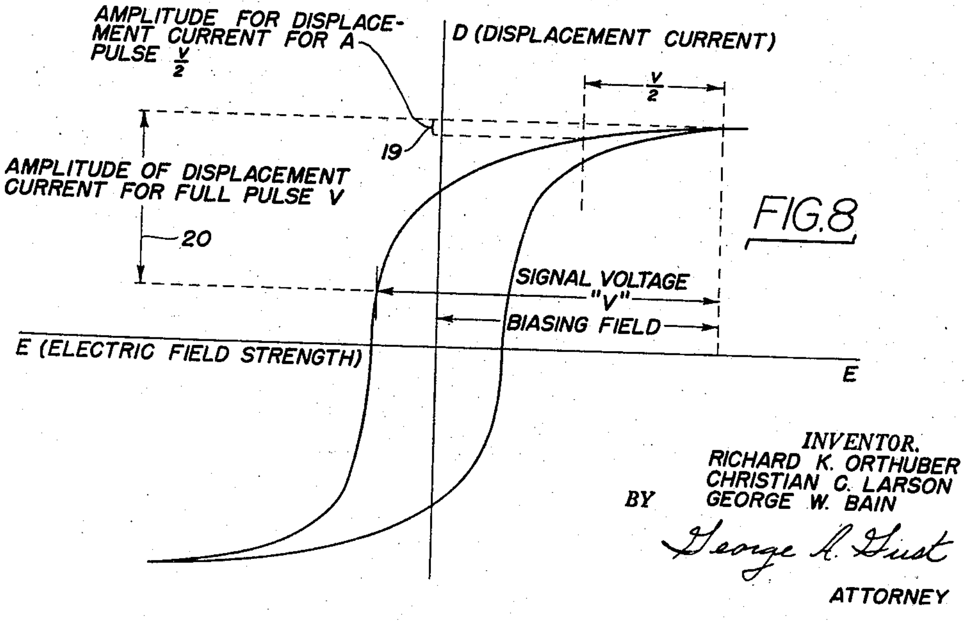
Fig. 8 is a graph used in explaining the operation thereof.

The biasing voltage is chosen so that the voltage pulse $$\frac{V}{2}$$

appearing between the selected and unselected strips does not reduce the biasing field sufficiently to drive the ferro-electric material out of the vicinity of near saturation as illustrated by the graph of Fig. 8.

The hysteresis loop of Fig. 8 is typical for ferroelectric materials. In this regard, see, for example, Kittel, "Introduction to Solid-State Physics," page 117. Extremely pronounced hysteresis loops which are very advantageous when used in this invention are disclosed in an article by A. von Hippel, "Review of Modern Physics," vol. 22, July 1950, pages 221–237.

The loop of Fig. 8 shows that with proper biasing the deleterious voltage pulse $$\frac{V}{2}$$

which appears along the entire length of the selected vertical and horizontal strips produces a relatively small amplitude displacement current as indicated by the reference numeral 19. However, the displacement current pulse appearing at the intersection of the selected strips $v_2$ and $h_3$ produced by the full amplitude voltage V will be not only doubled as with an ordinary dielectric, but will exceed the displacement current 19 by a much larger factor as indicated by the reference numeral 20.

This marked difference in displacement current between the intersection of two selected strips $v_2$ and $h_3$ and any of the other intersections of the panel may be explained as follows. The ferro-electric capacitive element $C_f$ which is in series with the phosphor element $C_p$ at the selected intersection of the strips $v_2$ and $h_3$ constitutes a much higher capacity than the corresponding ferro-electric elements on the remainder of the selected strips. Therefore, at the intersection $v_2$, $h_3$, the electroluminescent phosphor receives substantially the entire video pulse V whereas along the remainder of the selected strips only a small fraction of the undesired pulses $$\frac{V}{2}$$

is applied. It is apparent that the voltage produced at the connected intersection $v_2$, $h_3$ will be much brighter and therefore better discriminated as compared to the background brightness of the previous model. In comparison, the background brightness of the model of Fig. 5 is non-existent when compared to that of Fig. 1.

Such operation implies that if the exciting pulses for the respective strips consists of amplitude modulated video information, highlight pulse amplitudes are limited to a value V such that $$\frac{V}{2}$$

does not drive the biased ferro-electric material out of the range of substantially saturated condition. On the other hand, a lowlight pulse should be equal to or slightly exceed the value $$\frac{V}{2}$$

This may be achieved by gamma-correction in the video amplifier of a conventional television receiver or by superposition of video pulses on additionally generated pulses of constant amplitude $$\frac{V}{2}$$

Instead of the ferroelectric layer 9 (in Fig. 6) a polaristor layer, such as coarse graphite powder imbedded in a plastic layer, the hardening of the plastic having been performed with the graphite particles exposed to a strong polarizing electric field, as described in the above-referred to articles by H. E. Hollmann, may be used, the operation being similar, since such a layer also contributes an impedance which is high for a pulse of low amplitude and low for a pulse of high amplitude. The layer 9 in Fig. 6 may also be formed of semi-conductor material, such as amorphous selenium, as described in the above-referred to article on pages 314 through 334, volume 12 of the R. C. A. Review for September 1951. Consequently, as in the previous example, substantially the entire pulse amplitude is applied to the phosphor at a strip intersection which is receiving a highlight pulse V, whereas the unwanted pulse $$\frac{V}{2}$$

appearing between the selected and unselected strips will appear over the phosphor with much reduced amplitude, provided the impedances of the phosphor and polaristor layers are properly matched. The decoupling resistors 14 and 15, the bus bars 12 and 13, and the polarizing source 16 of Fig. 5 may be omitted in the case of a polaristor layer.

While we have described the above principles of our invention in connection with specific apparatus, it is to be clearly understood that this description is made only by way of example and not as a limitation to the scope of our invention.

What is claimed is:

1. A light producing screen comprising superposed abutting layers of electroluminescent phosphor material and ferroelectric material, a first plurality of spaced parallel conductors abutting the outer side of one of said layers, and a second plurality of spaced parallel conductors abutting the outer side of said other of said layers, said first and second plurality of conductors extending transversely of each other, at least one side of said light producing screen being light transmissive.

2. A light producing screen comprising superposed abutting layers of electroluminescent phosphor material and polaristor material, a first plurality of spaced parallel conductors abutting the outer side of one of said layers, and a second plurality of spaced parallel conductors abutting the outer side of said other of said layers, said first and second plurality of conductors extending transversely of each other, at least one side of said light producing screen being light transmissive.

References Cited in the file of this patent

UNITED STATES PATENTS

| | | |
|---|---|---|
| 2,313,286 | Okolicsanyi | Mar. 9, 1943 |
| 2,540,490 | Ritter | Feb. 6, 1951 |
| 2,698,915 | Piper | Jan. 4, 1955 |
| 2,735,049 | De Forest | Feb. 14, 1956 |
| 2,748,304 | Botden | May 29, 1956 |
| 2,768,310 | Kazan | Oct. 23, 1956 |
| 2,818,531 | Peek | Dec. 31, 1957 |